United States Patent [19]

Hüppe et al.

[11] Patent Number: 4,613,295
[45] Date of Patent: Sep. 23, 1986

[54] MOLDING APPARATUS WITH SENSOR MEANS

[75] Inventors: Reinhard Hüppe, Berlin; Helmut Käufer, Metzkausen; Hans J. Lemke, Hamburg, all of Fed. Rep. of Germany

[73] Assignee: U.S. Philips Corporation, New York, N.Y.

[21] Appl. No.: 646,024

[22] Filed: Aug. 29, 1984

Related U.S. Application Data

[63] Continuation of Ser. No. 420,653, Sep. 21, 1982, abandoned.

[30] Foreign Application Priority Data

Sep. 26, 1981 [DE] Fed. Rep. of Germany ....... 3138432

[51] Int. Cl.$^4$ ............................................. B29C 45/26
[52] U.S. Cl. ..................................... 425/542; 249/117
[58] Field of Search ............... 425/135, 137, 140, 141, 425/143, 144, 149, 150, 542; 73/432 B; 324/61 P; 249/117

[56] References Cited

U.S. PATENT DOCUMENTS

| 3,082,323 | 3/1963 | Chope et al. | 425/135 |
|---|---|---|---|
| 3,525,382 | 8/1970 | Devol | 425/137 |
| 3,718,721 | 2/1973 | Gould et al. | 264/40.6 |
| 3,767,339 | 10/1973 | Hunkar | 425/149 |
| 3,982,440 | 9/1976 | Groleau et al. | 264/40.1 |
| 4,066,725 | 1/1978 | Boettner | 264/40.1 |
| 4,143,114 | 3/1979 | Smith et al. | 264/40.6 |
| 4,146,601 | 3/1979 | Bishop | 264/40.1 |
| 4,204,612 | 5/1980 | Schrader et al. | 264/40.6 |
| 4,308,003 | 12/1981 | Salvy | 425/147 X |
| 4,482,860 | 11/1984 | Risko | 324/61 P |

FOREIGN PATENT DOCUMENTS

| 1116541 | 6/1968 | United Kingdom . |  |
| 0620385 | 7/1978 | U.S.S.R. | 264/40.1 |

Primary Examiner—Willard E. Hoag
Attorney, Agent, or Firm—Norman N. Spain

[57] ABSTRACT

An injection molding apparatus having a sensor probe means for determining a condition or property of a molded article when the mold is open.

1 Claim, 5 Drawing Figures

MOLDING APPARATUS WITH SENSOR MEANS

This is a continuation of application Ser. No. 420,653, filed 9/21/82 and now abandoned.

The invention relates to a method of optimizing an injection-moulding process, in which process parameters determining the quality, such as pressures, temperatures, speeds etc. are utilized and additionally at least one property of the product is converted into an electrical signal corresponding to an actual value for correction of at least one process parameter.

According to the article by Dr. Ing. Menges "Grundlagen der Prozesssteuerung beim Spritzgiessen" in the magazine "Kunststoffe", volume 61, 1971, part 2, p. 74–80, it is known for the control of the quality of injection-moulded parts to ascertain the weight respectively the dimensions of the injection-moulded parts outside the injection-moulding machine. The measured values are entered into the machine control for controlling the quality of the injection-moulded parts. Since the measuring devices are located outside the injection-moulding machine, time delays occur in the quality control.

The conditions for constant quality and a low percentage of rejection, in particular at the beginning of a manufacturing process, are that the required properties of the product are accurately maintained and are attained rapidly at the beginning of the process.

The invention has for its object to provide a method and an arrangement of the kind mentioned in the preamble, by means of which the required product properties are reached rapidly and are maintained.

According to the method of the invention, the property of the product is ascertained in the injection-moulding machine itself during the step of opening the mould and/or during the cooling phase.

Dependent upon the imposed requirements, for example, the dimensions, the hardness, the lustre, the weight or other properties of the product can be ascertained while the product is in the mould and be utilized as correction factors. It can then also be efficacious that the changes of the properties of the product, which according to experience are to be expected during the cooling phase, are taken into account when entering the correction signals.

Since such changes generally depend upon the starting material used, it is also possible to store such material-dependent values as fixed factors and to utilize them, dependent upon the material, in the correction process.

According to the invention, an arrangement suitable for carrying out the proposed method, for example, for maintaining given dimensions, is characterized in that the mould accommodates probe tips, the position of which can be determined and converted into electrical signals with the aid of means known per se, and in that these signals are supplied as correction factors to a regulating device, to which are supplied at the same time the process parameters converted into electrical signals.

An embodiment of an arrangement for carrying out the proposed method will now be described more fully with reference to the accompanying drawing, in which.

Figure 1:
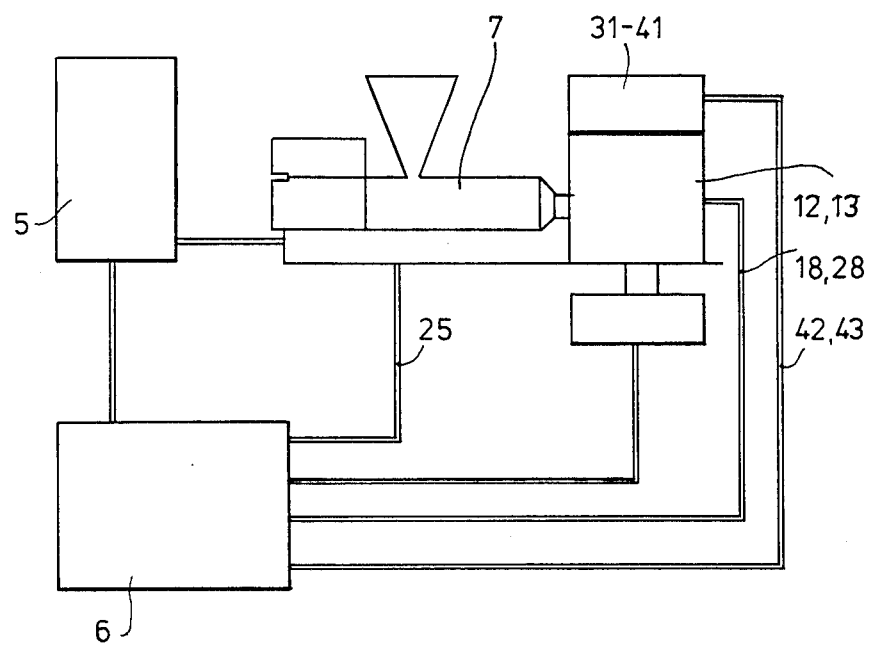
FIG. 1 is an overall elevation of a possible arrangement.

The parts of the arrangement shown in FIG. 1 are described more fully with reference to FIGS. 2 to 5.

Figure 2:
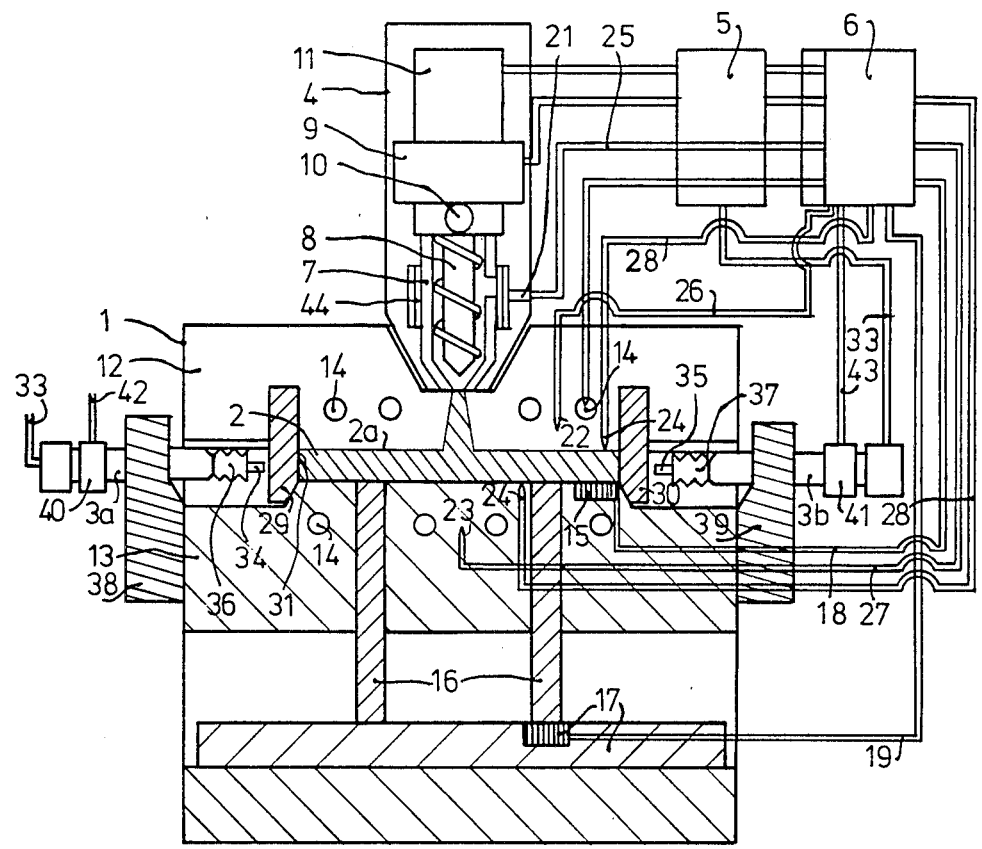
FIG. 2 shows an injection-moulding machine for manufacturing mouldings of synthetic resin with the mould closed comprising means for ascertaining a quality property as well as control and regulating devices according to the invention.
Figure 3:
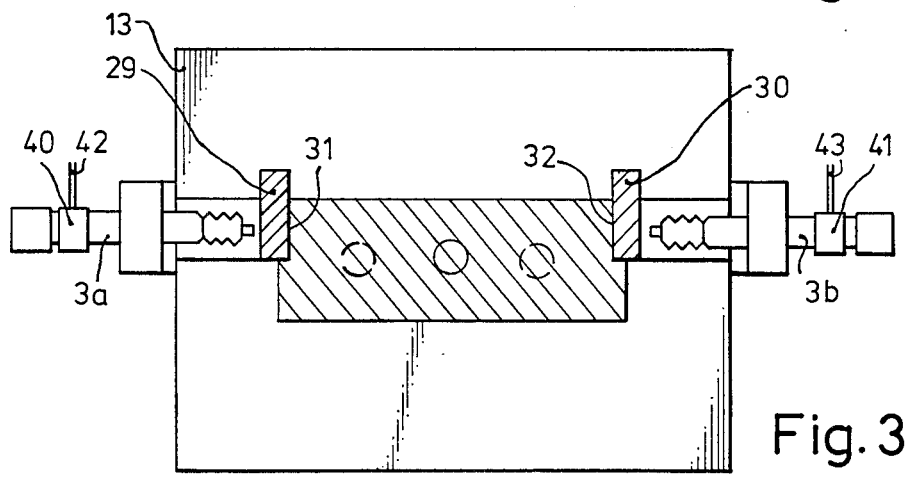
FIG. 3 shows the ejector part of the machine shown in FIG. 2, viewed at right angles to the junction plane.

FIG. 2 shows a closed injection-moulding tool 1 for manufacturing a moulding 2 of synthetic resin with means 3a, 3b for ascertaining a quality property as well as the injector part of an injection-moulding machine 4 with control and regulating devices 5 and 6. A screw piston 8 slidably arranged in a plastification cylinder 7 which can be heated by heating means 44 is set into rotation through a motor-gear combination 9 and plastifies in the space between the plastification cylinder 7 and the screw piston 8 a synthetic resin material supplied through a filling opening 10. By exertion of an axially directed force on the screw piston 8 by means of a pressure cylinder 11, the resultant plastified material is forced into a cavity 2a, which is enclosed by a mould half 12 forming the injection part and a mould half 13 forming the ejection part of the machine 1, whereupon this material is maintained under pressure for an adjustable time. The two mould halves 12 and 13 possess controllable tempering means 14, which permit of obtaining a different tempering of the two halves. The plastified material solidifies in the cavity 2a to form the moulding 2, while during the filling and solidifying phase, the pressure in the cavity 2a is measured directly or indirectly by a pressure measuring device 15 and 17, respectively, and is passed on to the regulating device 6 through leads 18 and 19 respectively. In the same time period the temperature of the plastification cylinder 7 is measured by means of a temperature measuring device 21, while the temperatures of the two mould halves 12 and 13 are measured by temperature measuring devices 22, 23 and the temperature of the mass in the cavity 2a is measured by one or more further temperature measuring devices 24, the measured values being passed on to the regulating device 6 through leads 25 to 28.

After the adjustable pressure-exertion and cooling time has elapsed, the tool is opened, the moulding 2 of synthetic resin remaining in the mould half 13. In this embodiment, two mould inserts 29, 30 give access to two measuring points 31, 32 on the moulding 2. Upon the occurrence of a signal of the regulating device, the means for ascertaining a quality property, for example a length, is now actuated; probe tips 34, 35 are moved by means of movable parts 36, 37 of measuring probes 3a and 3b which are fixed by securing members 38, 39 to the mould half 13, out of their rest position at the measuring points 31, 32 against the moulding 2, which is still fixedly positioned in the mould half 13 by the immediately preceding moulding process.

Figure 4:
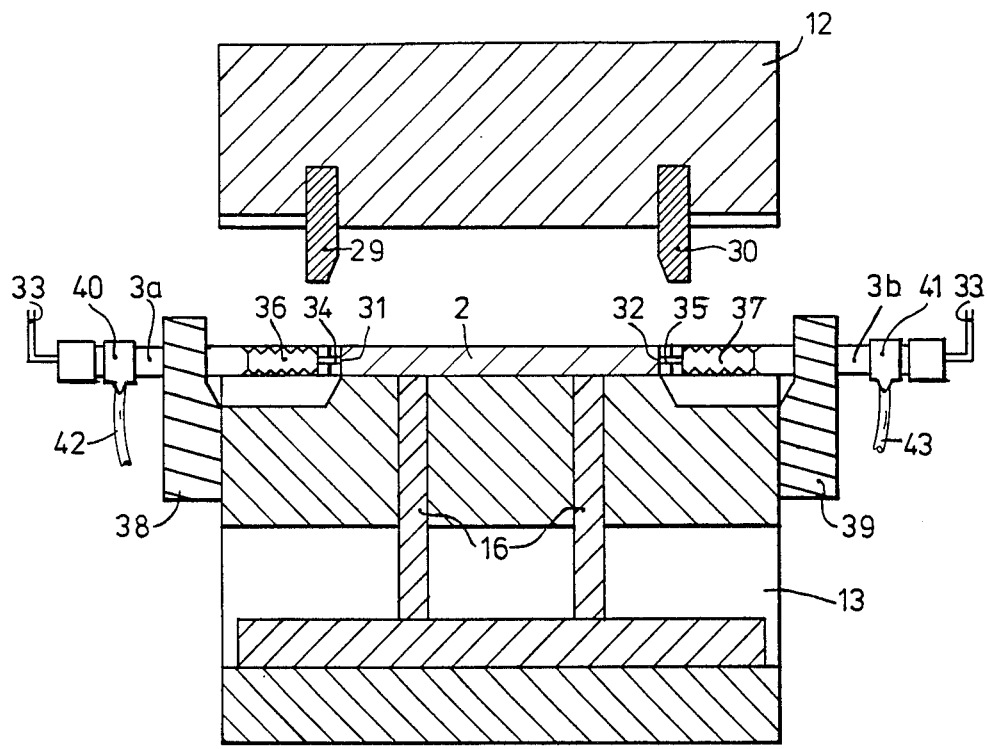
FIG. 4 shows the tool of FIG. 2, but with the mould in the opened position, in which the means for ascertaining a quality property is in the working position.
Figure 5:
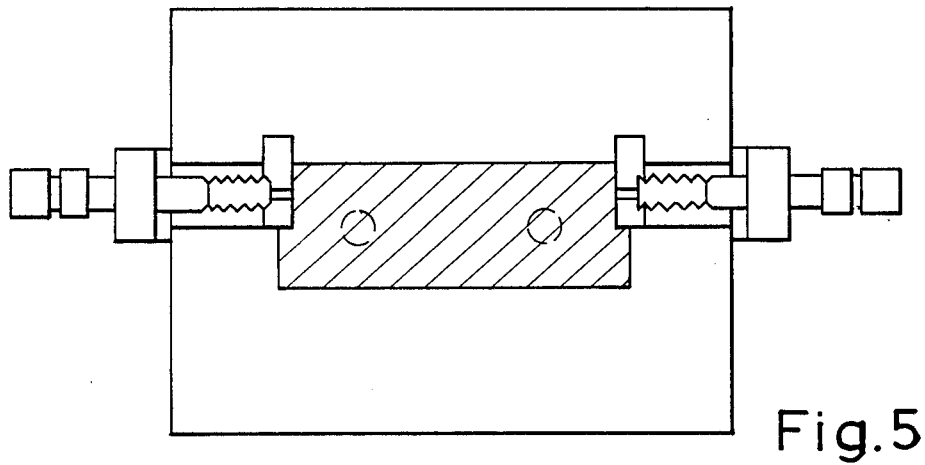
FIG. 5 shows the ejector part of the machine shown in FIG. 4, viewed on the junction plane.

FIG. 4 shows the measuring probes 3a and 3b, which are in the measuring position and the measured values of which are passed via transducers 40, 41 as an electrical signal through leads 42, 43 on to the regulating device 6. Simultaneously, the temperature is recorded by the regulating device through the temperature measuring device 24 and the lead 28. After the measured values have been received by the regulating device 6, the movable parts 36, 37 of the measuring probes 3a, 3b are reset to their rest position upon the occurrence of an electrical pulse through leads 33 and after receipt in the regulating device 6 of their final position via transducers 40, 41 and leads 42, 43, ejector pins 16 are caused through the control device 5 to move forwards and backwards, as a result of which the moulding 2 is ejected from the mould. During this mould-releasing phase, correction signals are generated in the regulating device from the temperature and pressure measurements made in the cavity 2a as well as the quality property measurements, which signals are passed through leads 44, 45 to the control device 5 to change and adapt the set values thereof. The extent of the correction is determined by the regulating device 6 itself according to an adaptation mechanism known per se.

It should be appreciated that an arrangement for carrying out the proposed method may also comprise devices, by means of which the weight, the hardness, the surface lustre and similar properties of the finished product may be ascertained, which—after they have been converted into electrical signals—influence the process parameters as correction factors.

The advantage of the proposed method consists in that the properties of the finished product are ascertained during the manufacturing process itself so that changes of the process parameters can be immediately initiated. As a result, the required properties are attained more rapidly and an unchanged quality is ensured.

What is claimed is:

1. In an injection molding apparatus having two coopeerating mold halves defining a mold cavity, a first of said halves having an injection part, the improvement comprising: sensor means adjacent one of said mold haves and movable into contact with a molded product within the mold when said mold halves are in separated position the first mold half having insert means movable therewith to give access to said product by said sensor means when the mold halves are in said separated position, said insert means blocking access to said mold cavity and said product by said sensor means when said mold halves are in closed position.

* * * * *